Aug. 6, 1935.  C. B. HASKINS  2,010,666
SCALE
Filed Dec. 23, 1930  3 Sheets-Sheet 1
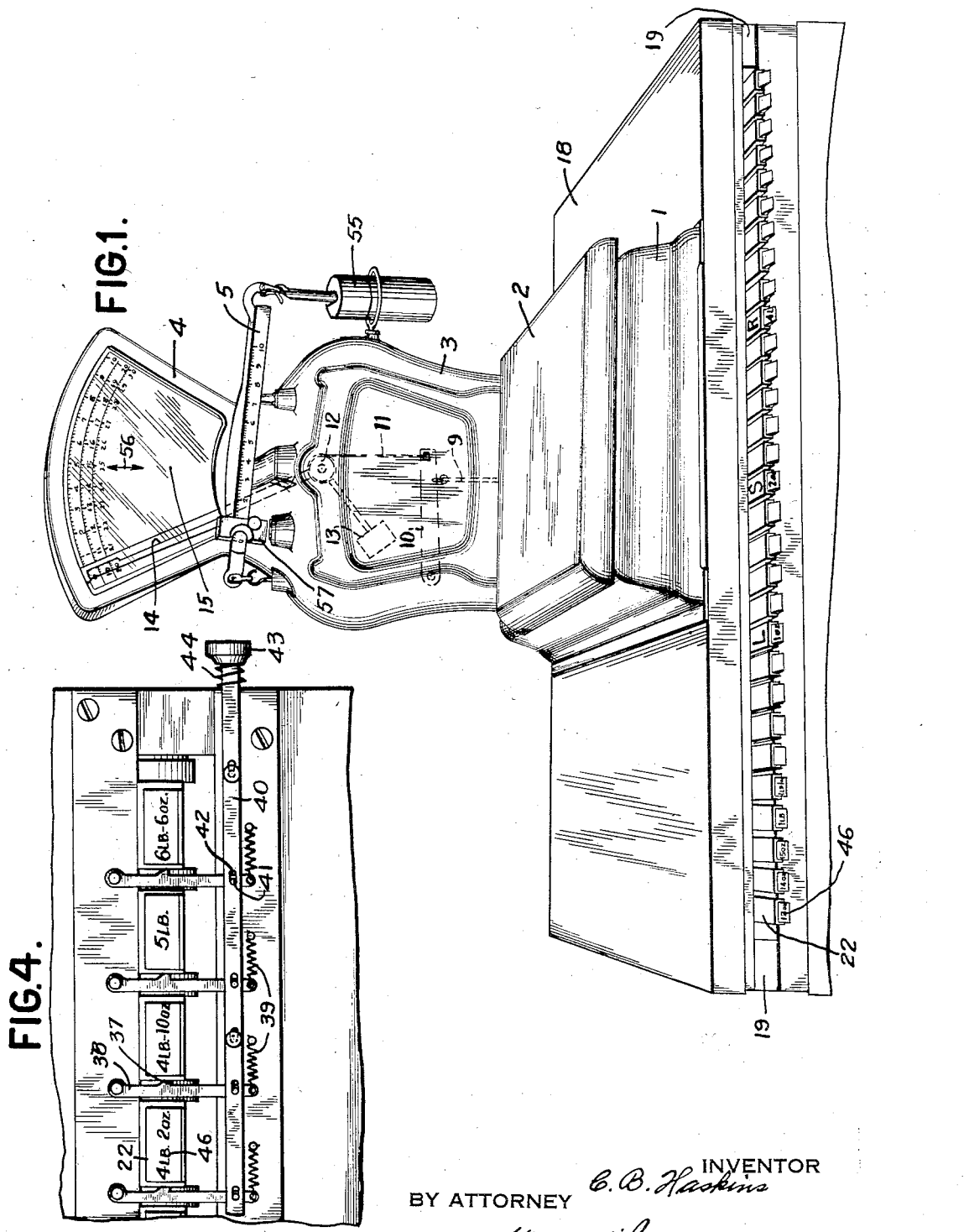
INVENTOR
C. B. Haskins
BY ATTORNEY
W. M. Wilson

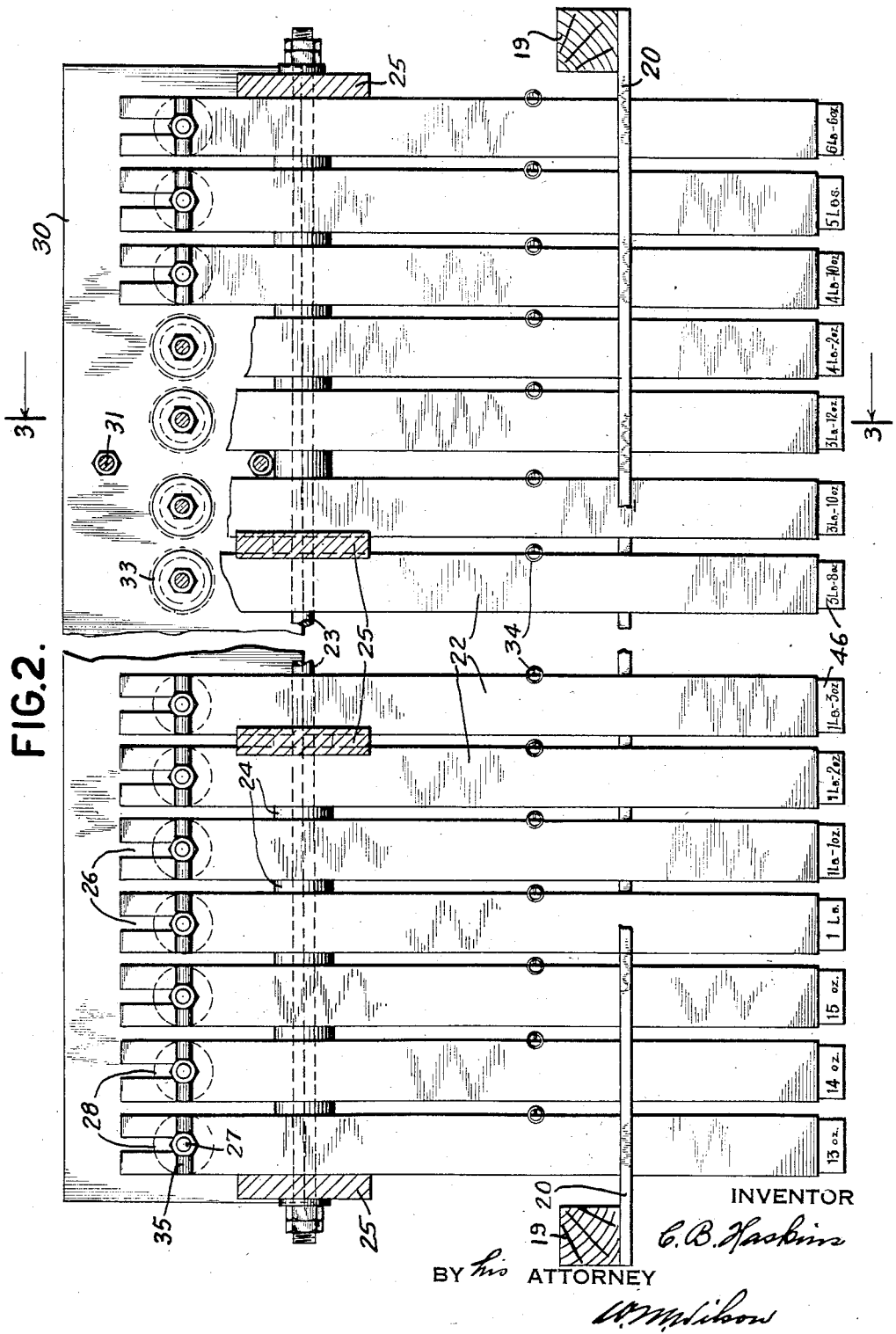

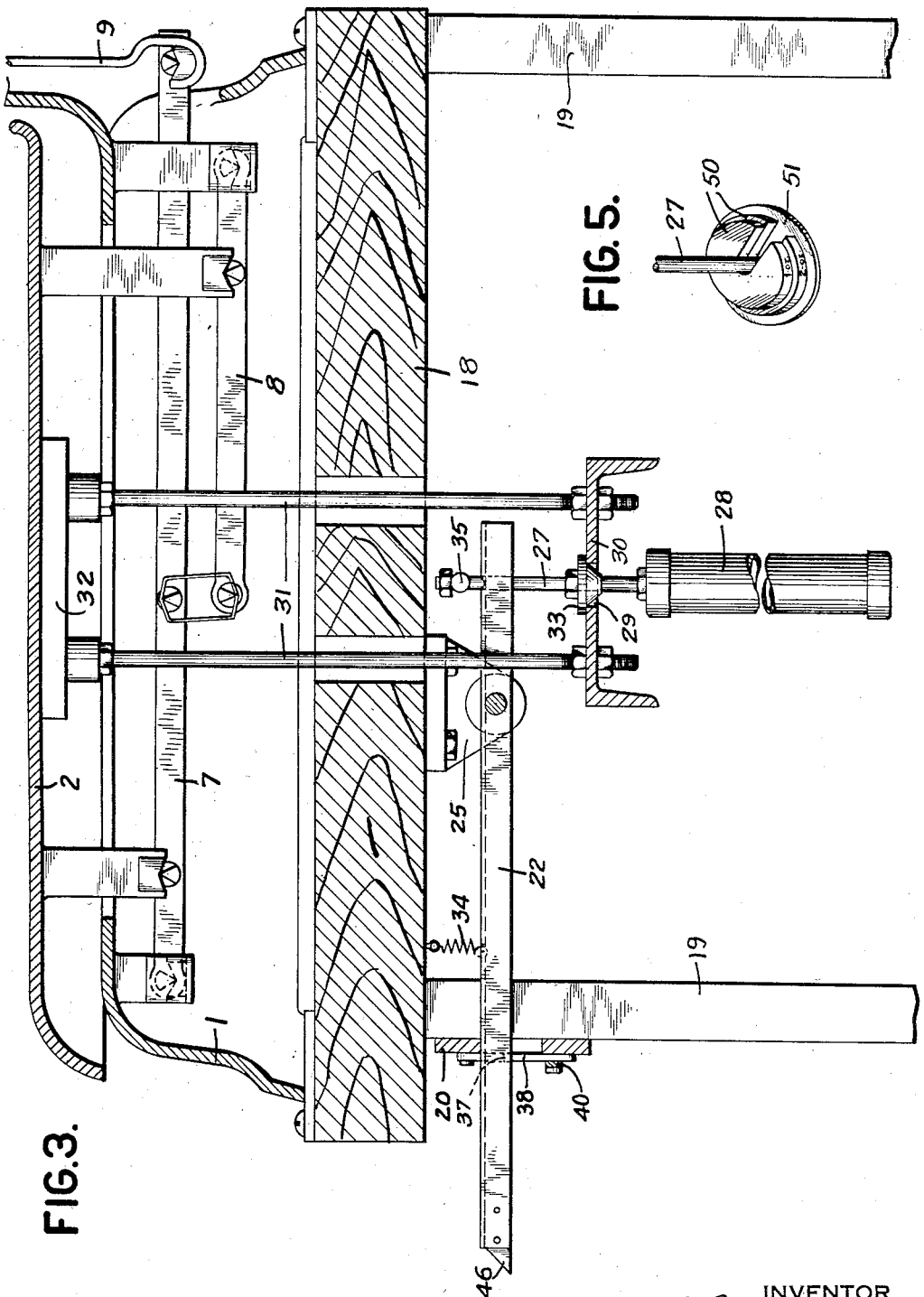

Patented Aug. 6, 1935

2,010,666

UNITED STATES PATENT OFFICE 2,010,666

SCALE

Clifford B. Haskins, Dayton, Ohio, assignor, by mesne assignments, to International Business Machines Corporation, New York, N. Y., a corporation of New York Application December 23, 1930, Serial No. 504,284

7 Claims. (Cl. 265—60)

This case relates to weighing scales and particularly to the tare means thereof.

In order to subtract tare of a container from the scales so that the amount of load on the platform may be directly shown by the scale indicator, it has been known to provide a tare beam and a poise adjustable along the tare beam to counterbalance the weight of the container. This procedure is clumsy and slow requiring the operator to be alert and accurate in positioning the poise on the beam, graduations of which usually are very close together. It is common experience to position the poise one or two graduations away from the correct reading. To be more accurate, entails too much time.

It has also been known to move the chart backward relative to the pointer to subtract the tare indication from the chart. Thus, a 2 lb. 2 oz. container will move the pointer to the 2 lb. 2 oz. mark of the chart. By moving the latter forward till the zero mark is again opposite the pointer, a further load will be directly indicated by the pointer and chart. This too is a slow and inaccurate procedure as the marks are fairly close together.

The present invention has for its object a novel mechanism for subtracting tares from the scale.

More specifically, the object is to provide readily and individually operable members, such as keys, for subtracting tares.

When a container is placed on the platform, it usually has the weight marked thereon. All that the operator need do is depress a key or keys marked with the weight of the container and its tare will be immediately subtracted from the reading of the scale.

Various other objects and advantages of my invention will be obvious from the following particular description of one form of mechanism embodying the invention or from an inspection of the accompanying drawing; and the invention also constitutes certain new and novel features of construction and combination of parts hereinafter set forth and claimed.

In the drawings:

Fig. 1 is a perspective view of the scale and tare mechanism.

Fig. 2 is a sectional plan view of the tare mechanism below the scale platform.

Fig. 3 is a section on line 3—3 of Fig. 2,

Fig. 4 is a detail of the front of the tare mechanism, and

Fig. 5 is a detail of the weights in a modified form.

The invention has been applied for disclosure purposes to a scale shown in Patent No. 867,671. It includes a base housing 1, platform 2, intermediate housing 3, upper fan housing 4, and capacity beam 5. The platform is supported on main and auxiliary levers 7 and 8, respectively.

The main lever at the inner end bears on a draft rod 9 connected to an intermediate beam 10, in turn connected to a tape 11 fastened to the power sector 12 of a pendulum counterbalance 13.

Fastened to the power sector hub is a pointer 14 for reading a chart 15. To subtract tare from the platform and enable indicator 14 and chart 15 to directly indicate the load minus the container weight, the following novel mechanism is provided.

The scale rests on a frame shelf 18 mounted on front and rear legs 19. To the front legs is fastened a pair of spaced horizontally extending boards 20 between which and projecting past their front are disposed the key levers 22. The levers are rotatably carried by a common shaft 23 (Fig. 2) and spaced from each other by washers 24 on the shaft. The shaft is carried in brackets 25 bolted to the bottom of the frame shelf 18. The rear ends of the levers 22 have notches 26 for receiving the stems 27 of weights 28. The stems 27 pass through holes 29 in a bar or sub-platform 30 which is rigidly suspended by rods 31 from the plate 32 fast to the bottom of the platform. To support the weights 28 from bar 30 the stems 27 are provided with stop members 33 for engaging the upper surface of the bar.

Initially, the scale is so adjusted that when all the weights 28 are carried by the bar 30, the pointer 14 reads zero on the chart 15.

At the beginning of a weighing operation, the weights 28 are all carried by the bar and the levers 22 are held free of the weights by means of springs 34 (Fig. 3). When the front or key end of a lever 22 is depressed, the rear end moves upward to engage the transverse lugs 35 of the upper end of the stem 27 seated in the slot 26 of the lever. The stem 27 and weight 28 are thereby lifted so that the members 33 are free of the bar 30.

When a key is depressed, it is locked under the projection 37 of a latch 38 pivoted at its upper end to the upper board 20. Springs 39 urge the latches to locking position. After an operation, the keys may be released by a horizontal bar 40 slidably supported for movement along the lower board 20 by means of studs 41 on the lower board seated in horizontal slots 42 of the bar 40. The end of bar 40 is provided with a knob 43 which the operator grasps to push the bar to the left, as viewed in Fig. 4, against resistance of spring 44 for releasing the latches 38.

Each key lever 22 carries in front a marker 46 having inscribed thereon the amount in pounds and ounces of the weight 28 associated with the lever.

The apparatus is used as follows:

Assume the container carrying the load on the platform weighs 4 lbs. 10 oz. All that the operator need do is depress the third key 22 from the right in Fig. 4. This will cause the lever 22 to lift a weight 28 of 4 lbs. 10 oz. from the sub-platform 30 and relieve the platform 2 of this much load, thereby exactly counteracting the weight of the container. Pointer 14 will now show the load on the platform minus the tare of the container.

If the exact weight of the container is not shown by a single marker 46 of a lever 22, a combination of the latter may be used. Thus, if the tare is 4 lbs. 12 oz., the key marked 3 lbs. 12 oz. and the key marked 1 lb. (see Fig. 2) are both depressed. In a similar way practically any other desired amount of tare may be subtracted by depressing one or a combination of keys 22.

Instead of using fixed weights 28, removable weights such as 50 (Fig. 5) may be provided on stem 27. The latter will then be provided with a fixed plate 51 at the lower end on which the weights 50 may rest. Each weight is notched to permit it to slide laterally over the rod 27. This construction permits a ready adjustment of the value of the counterweight operated by any single key.

The invention has many applications besides that of offsetting tare. For example, it may be used for formula compounding purposes. Assume that it is desired to mix a rubber compound consisting of 4 pounds crude rubber, 1 ounce lampblack, and 2 ounces of sulphur. The weights 50 may be adjusted on the stems 27 in accordance with the ingredients of the compound to provide counterweights equal to 4 pounds, 1 ounce, and 2 ounces. The keys for operating these counterweights are distinguished from the others by marking each of them in red pencil or the like with a letter indicating the ingredient to which it corresponds. A weight 55 is then disconnected from one end of the usual tare beam 5. This weight 55 when connected to the beam assists in counteracting the tendency of the platform and other weighted parts from moving the indicator forward. It is of such magnitude that when disconnected from the tare beam, the pointer 14 moves to a mark 56 substantially at the center of the chart 15.

The container is then placed on platform 2 and its tare subtracted by operating one of the keys 22 or by moving the poise 57 along the tare beam 5.

The pointer now stands at mark 56. The operator depresses the selected key 22 marked with the letter R corresponding to crude rubber. This moves the pointer back from mark 56 an amount equal to 4 lbs. The operator pays no attention to the extent of rearward movement of the pointer but simply places sufficient crude rubber in the container to return the pointer to the mark 56. The key marked L corresponding to lampblack is then depressed and the operator adds lampblack to bring the pointer to the mark 56. Similarly with the sulphur.

In this manner, the compounding of formulas is reduced to the simplest mechanical steps which may be controlled by an unskilled operator.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims:

1. A scale comprising an exposed platform on which the article or articles to be weighed are placed, weight indicating means operated thereby, a series of weights carried by the platform and depressing the latter to cause movement of the indicating means in a direction indicating increasing weight, and means for selectively supporting said weights free of the platform to subtract the effect of predetermined loads of articles added to the platform and cause the indicating means to move in a reverse direction indicating decreasing weight.

2. A scale comprising a load support, a load indicating means operated thereby, a series of weights of different amounts supported by the load support, a series of key members, one for each weight and operable to associate and dissociate the weight from the support, and means for retaining a key member in displaced position after an operation thereof.

3. In a weighing machine, a load controlled weighing mechanism including devices to serve as substitutes for definite loads, levers, each connected to one of said devices for operating it, detents, one for each lever to retain it in operated position, and a common releasing device for all the detents.

4. In a weighing machine, as a subcombination, a load controlled weighing mechanism including a platform on which the article to be weighed is placed, weights carried by and below said platform to underlie the latter, and means for at will operating any one or more of said weights to release their effects from the platform and thereby subtract the effect of a predetermined article load on the platform.

5. In a scale, a load responsive system, a base housing for said system, a support on which the housing rests, devices operable for subtracting the effect of predetermined loads acting on the system, said devices being located below the housing support, and connections from the said devices to the load responsive system passing through said housing support.

6. A scale comprising automatic counterbalance mechanism, a platform for carrying an article, operative connections between the platform and mechanism, an indicator operated under control of said mechanism in one direction upon application of a load to said platform and to an extent corresponding to and indicating the weight of the article on the platform, said indicator having a limited predetermined stroke, a series of weights normally applied to and acting upon said mechanism, and means for selectively relieving said weights from said mechanism to reverse the movement of the indicator an amount less than the full stroke of the indicator and in accordance with the magnitude of the relieved weight or weights.

7. In a scale, a load platform, a base housing below the platform, indicating means, connections between the indicating means and the main platform extending into the base housing, a sub-platform below the top of the base housing, removable vertical connections between the load platform and the sub-platform passing into the base housing and rigidly suspending the sub-platform from the load platform, a plurality of weights, and means for selectively applying and removing said weights from the sub-platform to vary the action of the indicating means.

CLIFFORD B. HASKINS.